United States Patent [19]

Gerber et al.

[11] Patent Number: 5,761,162
[45] Date of Patent: Jun. 2, 1998

[54] MULTI-ELEMENT PRISM FOR OPTICAL HEADS

[75] Inventors: Ronald E. Gerber, Rochester; Timothy S. Gardner, Webster; David B. Kay, Rochester, all of N.Y.

[73] Assignee: Eastman Kodak Company, Rochester, N.Y.

[21] Appl. No.: 742,239

[22] Filed: Oct. 31, 1996

[51] Int. Cl.⁶ .................................................. G11B 7/085
[52] U.S. Cl. ................................ 369/44.23; 369/112
[58] Field of Search ........................... 369/44.23, 44.24, 369/44.37, 44.41, 44.42, 112

[56] References Cited

U.S. PATENT DOCUMENTS

| 4,712,205 | 12/1987 | Smid et al. | 369/45 |
| 5,406,541 | 4/1995 | Kay | 369/120 |
| 5,491,675 | 2/1996 | Kay | 369/44.23 |
| 5,623,462 | 4/1997 | Tezuka et al. | 369/44.23 |

OTHER PUBLICATIONS

M.R. Latta et al., "Effect of Track Crossing on Focus Servo Signals: Feedthrough," SPIE Proceedings, vol. 1663, Optical Data Storage, 1992.

R. Katayama et al., "Multi-beam magneto-optical disk drive for parallel read/write operation," SPIE Proceedings, vol. 1078, Optical Data Storage Topical Meeting, Jan. 17–19, 1989.

Pp. 172–179 of A. Marchant, "Optical Recording: A Technical Overview," Addison–Wesley, Reading, Mass.

*Primary Examiner*—Thang V. Tran
*Attorney, Agent, or Firm*—Raymond L. Owens

[57] ABSTRACT

An apparatus for providing focus and tracking error signals for controlling an application of a radiation beam to a data track of an optical storage medium is disclosed. The present invention describes a multi-element optical prism having at least four separator elements with each separator element engaging at least three other separator elements and at least two separator elements surrounding two inner separator elements and engaging each other at spaced apart positions. This apparatus permits a single return path, a reduced cross talk between focus and tracking error signals, and a reduced track offset.

9 Claims, 6 Drawing Sheets

MULTI-ELEMENT PRISM FOR OPTICAL HEADS

CROSS REFERENCE TO RELATED APPLICATION

The present invention is related to U.S. patent application Ser. No. 08/742,237 filed simultaneously herewith, entitled "Multi-Element Prism for Optical Heads", to Gardner et al, assigned to the assignee of the present invention. The disclosure of this related application is incorporated herein by reference.

FIELD OF THE INVENTION

The present invention relates generally to optical heads used in optical information storage and retrieval systems. More particularly, the present invention relates to multi-element optical prisms for use in such heads.

DESCRIPTION OF THE PRIOR ART

Figure 1:
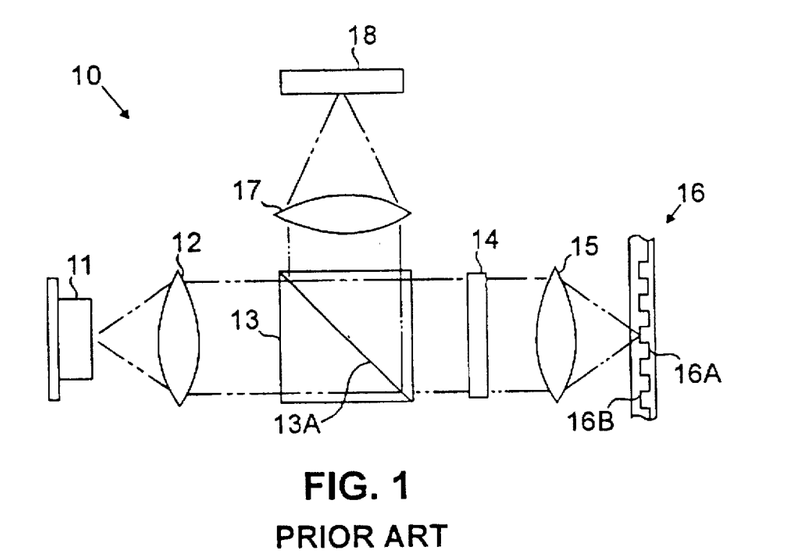
FIG. 1 is one version of a prior art an optical information storage and retrieval system.

FIG. 1 shows an exemplary optical information storage and retrieval system 10 in accordance with the prior art. An optical source 11, such as a laser diode, provides a radiation beam which is collimated by collimating lens 12. The collimated radiation beam is transmitted through a polarization beam splitter 13 and applied to a quarter-wave plate 14. The polarization beam splitter 13 transmits a linear polarization of the radiation beam, such as a p-polarization, and quarter-wave plate 14 provides a circular polarization to the linearly polarized radiation beam. The circularly polarized radiation beam from the quarter-wave plate 14 is focused by objective lens 15 onto a data track 16B. The data track 16B is on a surface 16A of an optical storage medium 16. The storage medium 16 may be, for example, any optical disk having a surface which interacts with an incident radiation beam.

The interaction with the storage medium surface 16A causes the incident radiation beam to be reflected and diffracted therefrom. The resulting radiation beam, referred to herein as a return beam, is collimated by objective lens 15 and then passes through the quarter-wave plate 14. The quarter-wave plate 14 converts the circular polarized return beam to a linear s-polarized return beam. The linear s-polarization is perpendicular to the p-polarization of the radiation beam transmitted from polarization beam splitter 13. When the s-polarized return beam is applied to the polarization beam splitter 13, it is reflected by a surface 13A of the beam splitter 13. The surface 13A may be, for example, a multilayer coating which transmits p-polarized light and reflects s-polarized light. A focusing lens 17 converges the reflected return beam onto a detector array 18. The detector array 18 detects portions of the return beam which are used to provide, for example, a focus error signal (FES), a tracking error signal (TES), and a data signal. The FES and TES are generally used to drive servo systems for maintaining the radiation beam in-focus and on-track, respectively, relative to the storage medium. The data signal is indicative of the data stored on the data track scanned by the radiation beam. The components of an optical system which process, direct and detect the return beam to provide an FES and a TES, and in some cases also a data signal, may be collectively referred to as a focus and tracking sensor system.

A number of other prior art optical systems split the return beam into two or more beams, each of which is directed to a separate detector array. For example, one detector array may be used to generate a TES and a data signal from one of the beams, while another detector is used to generate an FES from another beam. Such an approach generally requires additional components and therefore increases the size, complexity and cost of the optical system.

Other prior art systems reduce the number of optical components by directing the return beam to an optical beam-separating device such as a dual or four element prism followed by a single detector array. A four element prism will be referred to herein as a quad prism. The FES, TES and data signal are thus all collected using a single return path. Such systems will be referred to herein as single return path systems. An exemplary single return path focus and tracking sensor system is described in M. R. Latta et al., "Effect of Track Crossing on Focus Servo Signals: Feedthrough," SPIE Proceedings, Vol. 1663, Optical Data Storage, 1992. The Latta et al. reference describes a system in which an anamorphic lens, or alternatively a combination of a spherical and a cylindrical lens, is used to direct a single return beam to a quad detector. The quad detector generates an astigmatic FES, a push-pull TES, and a data signal.

Another prior art single return path focus and tracking sensor system is described in U.S. Pat. No. 4,712,205, issued to Smid et al. as assignee of U.S. Philips Corporation. The Smid et al. system provides a dual half-aperture FES, a push-pull TES and a data signal using a single detector array. The return beam is divided by a compound wedge into two separate beams which are directed to two dual element detectors in the single detector array. One significant problem with this system is high crosstalk between the FES and the TES. This and other problems with the Smid et al. system are described in more detail in U.S. Pat. No. 5,406,541.

Figure 2:
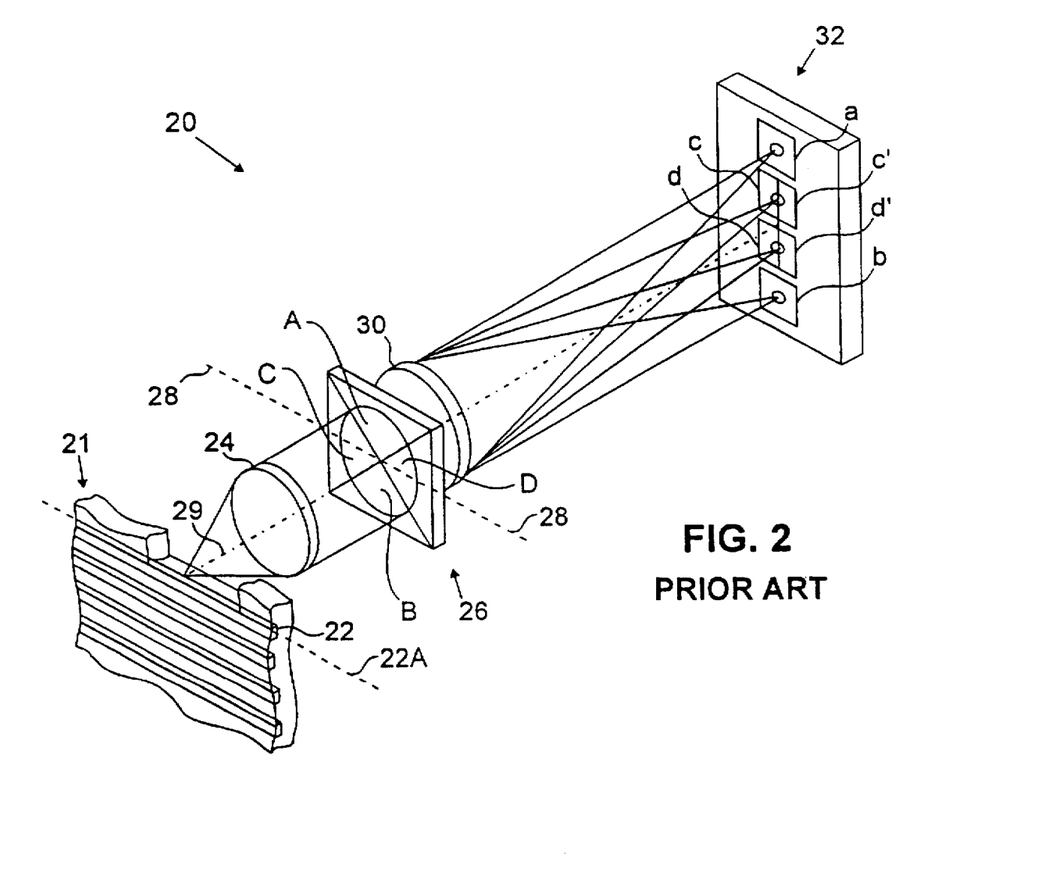
FIG. 2 is a prior art single return path optical focus and tracking sensor system.

FIG. 2 shows an exemplary implementation of another prior art single return path focus and tracking sensor system 20, described in R. Katayama et al., "Multi-beam magneto-optical disk drive for parallel read/write operation," SPIE Proceedings, Vol. 1078, Optical Data Storage Topical Meeting, Jan. 17–19, 1989. The optical system 20 uses a radiation beam to read and/or write data on a data track 22 of an optical storage medium 21. Only a portion of optical storage medium 21 and data track 22 is shown in FIG. 2. The return beam reflected and diffracted from the data track 22 is collimated by an objective lens 24 and is incident on a quadrant prism 26. A quadrant prism is a type of quad prism in which the four separator elements are arranged as quadrants. The dashed line 22A represents a tangent to data track 22 at a point illuminated by the radiation beam. The dashed line 28 is substantially parallel to the data track 22 and represents a projection of the data track 22 on the quadrant prism 26. The dashed line 29 represents an optical axis of the incident radiation beam. The quadrant prism 26 includes four separator elements A, B, C and D. Each of the separator elements A, B, C and D directs a portion of the return radiation beam from objective lens 24 through a focusing lens 30 to a detector array 32. The detector array 32 includes a number of detector elements a, b, c, c', d and d'. Separator elements A, B, C and D direct four different portions of the return beam toward detector elements a, b, c and c', and d and d', respectively. In the system 20, an FES, a TES and a data signal (DS) are generated from the portions of the return beam incident on the following detector elements:

$$FES=(c+d')-(c'+d)$$

$$TES=a-b$$

$$DS=a+b+c+c'+d+d'$$

The above relationships specify the manner in which signals from the various detector elements are combined to generate the FES, TES and data signal, respectively. It should be noted that certain components present in the system 10, such as the polarization beam splitter 13 and the quarter-wave plate 14, are not shown in system 20 for purposes of clarity.

Depending upon the design of the above-described single return path systems, various amounts of optical crosstalk may originate from, for example, diffracted radiation components and optical wavefront aberrations in the return beam. The presence of optical crosstalk may limit the effectiveness of certain optical systems, particularly those systems which utilize high performance servomechanisms to control focus and tracking of the incident radiation beam. Although commonly assigned U.S. Pat. No. 5,406,541 discloses a structure which reduces the effect of optical crosstalk by implementing an orthogonality condition between the focus and tracking sensors, it does so using separate optical paths for generating the focus and tracking signals. The need for additional components to create and process separate optical paths adversely affects the cost and complexity of the optical system.

Figure 3:
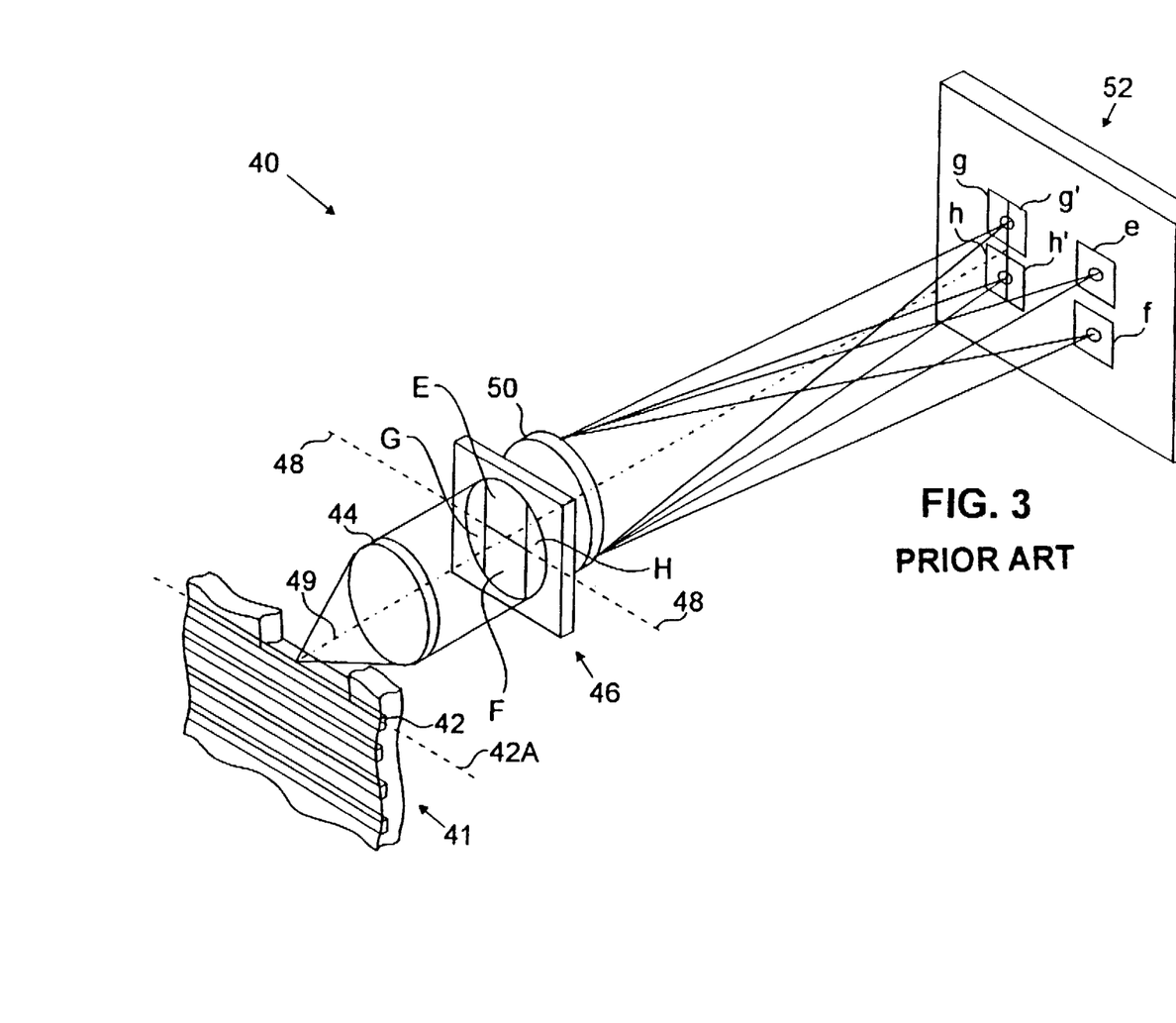
FIG. 3 is another prior art single return path optical focus and tracking sensor system.

In commonly assigned U.S. Pat. No. 5,491,675 to Kay many of the above problems are decreased. In this patent a multi-element prism is disclosed. FIG. 3 shows this implementation of the system 40 described in U.S. Pat. No. 5,491,675 to Kay, where low crosstalk is achieved. The optical system 40 uses a radiation beam to read and/or write data on a data track 42 of an optical storage medium 41. Only a portion of optical storage medium 41 and data track 42 is shown in FIG. 3. The return beam reflected and diffracted from the data track 42 is collimated by an objective lens 44 and is incident on a quadrant prism 46. This quadrant prism differs from that shown in FIG. 2. The dashed line 42A represents a tangent to data track 42 at a point illuminated by the radiation beam. The dashed line 48 is substantially parallel to the data track 42 and represents a projection of the data track 42 on the quadrant prism 46. The dashed line 49 represents an optical axis of the incident radiation beam. The quadrant prism 46 includes four separator elements E, F, G, and H. Each of the separator elements E, F, G, and H directs a portion of the return beam from objective lens 44 through a focusing lens 50 to a detector array 52. The detector array 52 includes a number of detector elements e, f, g, g', h, and h'. Separator elements E, F, G, and H direct four different portions of the return beam toward detector elements e, f, g, g', h, and h', respectively. In the system 40, an FES, a TES, and a data signal (DS) are generated from the following portions of the return beam incident on the following detector elements:

FES=$(g+h')-(g'+h)$

TES=$e-f$

DS=$e+f+g+g'+h+h'$

Although the structure described in U.S. Pat. No. 5,491,675 to Kay is quite effective, there is still a problem in that the location of the focused spot on the optical disk when the disk is tilted cross track and when the tracking servo locks to the center of the open loop TES signal derived from using the techniques outlined still does not correspond to the optimum position for reading and writing the data. This problem shall be referred to as track offset. As is apparent from the above, a need still exists for an optical system which can generate an FES, a TES, and a DS with a single return path with low crosstalk and a small track offset.

SUMMARY OF THE INVENTION

It is an object of the present invention to provide an improved multi-element prism which solves the track offset problem with disk tilt cross track discussed above.

It has been determined, unlike the above referenced Kay multi-element device, that when a multi-element prism is arranged so that non-adjacent elements are used to produce the tracking error signal, the tracking offset is reduced. Stated differently, since the tracking error signal is produced from elements at the edge of the device, track offset is reduced.

This object is achieved by an apparatus for providing tracking and focus error signals for controlling an application of a radiation beam to a data track of an optical storage medium, said apparatus comprising:

a multi-element prism having at least a first separator element, a second separator element, a third separator element, and a fourth separator element with at least three of the separator elements having a linearly-sloped beam-directing surface, the multi-element prism adapted to separate a return beam resulting from said application of said radiation beam to said data track into at least a first portion, a second portion, a third portion, and a fourth portion, respectively, such that said first and said second separator elements separate said return beam along at least one plane substantially parallel to a reference plane defined by an optical axis of said radiation beam and a projected normal to the data track, and each separator element engaging at least three other separator elements with the first and second separator elements engaging each other and, respectively, the third and fourth separator elements engaging each other at spaced apart locations such that the third and fourth elements surround the first and second elements and means for detecting said first, second, third, and fourth portions to produce the tracking and focus error signals.

ADVANTAGES

By having the third and fourth separator elements surround the first and second separator elements, the tracking error signal in a single return path apparatus which has low crosstalk will have significantly reduced track offset.

DETAILED DESCRIPTION OF THE PREFERRED EMBODIMENTS

Figure 4:
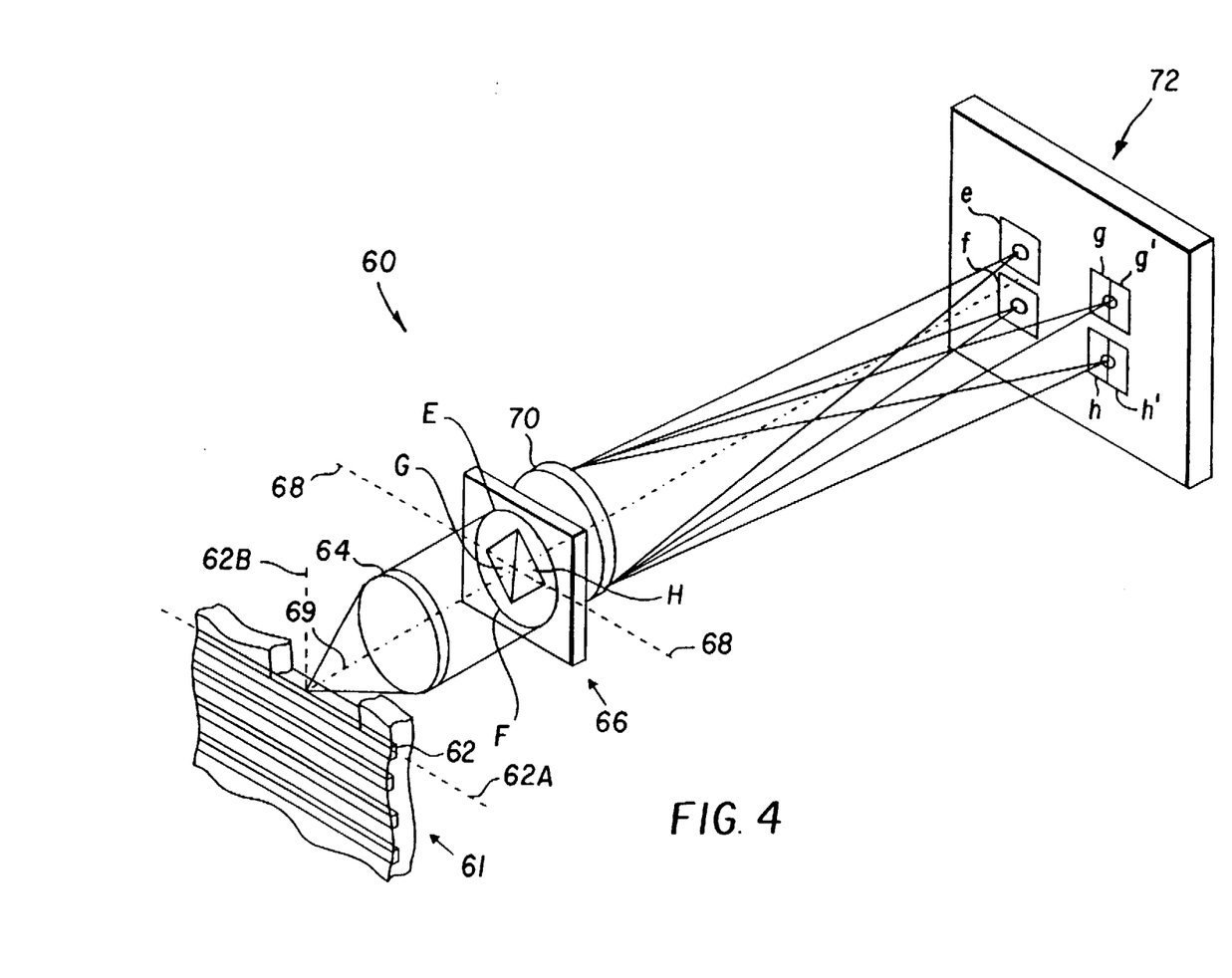
FIG. 4 is a single return path optical focus and tracking sensor system which uses a multi-element prism in accordance with the present invention.

FIG. 4 shows an exemplary single return path focus and tracking sensor system in accordance with the present invention. It should be noted that certain optical system components, such as, for example, a polarization beam splitter and a quarter-wave plate, are not shown but may also be included in the system 60. In addition, the system 60 is generally part of an optical system having a number of other components, such as, for example, an optical source and a collimating lens. The arrangement of FIG. 4 may thus be implemented in any of a number of different optical systems and applications, including, for example, the optical information and retrieval system 10 shown in FIG. 1. A multi-element beam separator in accordance with the present invention could be located, for example, between polarization beam splitter 13 and focusing lens 17, or between lens 17 and detector array 18, in the optical system 10 of FIG. 1. The multi-beam separator element 66 shown in this view is shown in more detail in FIGS. 5a, 6a, and 7a.

The exemplary system 60 of FIG. 4 processes a return beam reflected and diffracted from a data track 62. The data track 62 is a diffraction component-generating structure present on the surface of an optical recording medium. The structure diffracts the incident radiation beam because the depth of the structure is generally a fraction of the wavelength of an incident radiation beam and introduces phase differences in the return beam. The term "data track" as used herein includes other diffraction component-generating structures such as, for example, a raised structure or a groove in the storage medium, a region between two grooves in the storage medium, a series of unconnected raised regions, and other optical path structures of appropriate dimension and refractive index such that diffraction patterns are created in response to an incident radiation beam.

The return beam is incident on an objective lens 64 which directs the return beam to a multi-element prism 66. The multi-element prism 66 is shown in more detail in FIGS. 6a–7c, which will now be described. In all these embodiments, it includes four separator elements E, F, G, and H which may be constructed of, for example, glass, plastic, molded glass, or molded plastic. The separator elements E, F, G, and H separate the return beam into four different portions. In this exemplary embodiment, each of these portions is focused on a different detector in a detector array 72. The focusing lens 70 is arranged between the multi-element prism 66 and detector array 72 to converge the separated portions of the return beam onto the appropriate detectors in detector array 72. In order to accomplish the separation at the detector plane, it is important that at least three of the separator elements include linearly-sloped beam-directed surfaces. This feature will be described in more detail with reference to FIGS. 5a–7c. It should be understood that the multi-element prism 66 having separator elements E, F, G, and H may be replaced with other types of multi-element beam separators having corresponding separator elements capable of separating the return beam into a number of distinct portions.

Figure 5A:
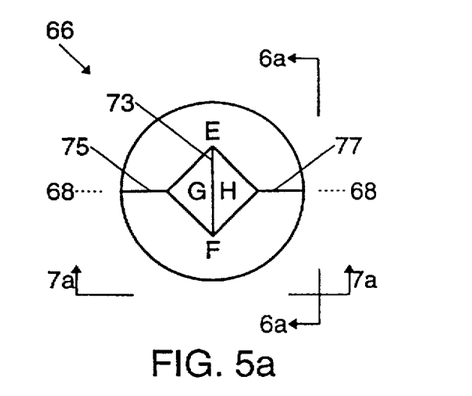
FIGS. 5a, 5b, and 5c show multi-element prisms which can be used in accordance with the present invention.
Figure 5B:
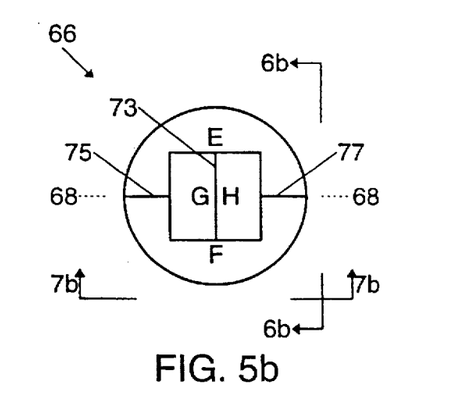
Figure 5C:
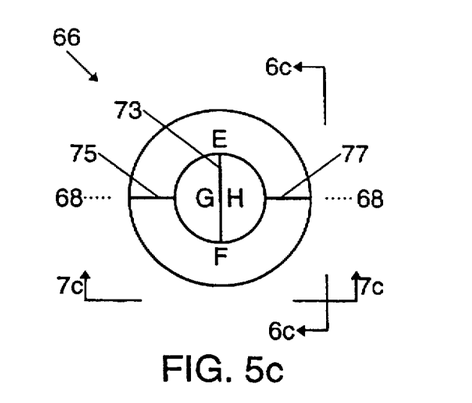
Figure 6A:
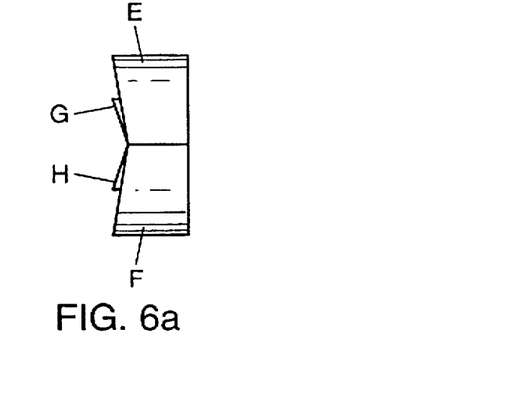
FIGS. 6a, 6b, and 6c are side views respectively taken along the lines 6a–a, 6b–b, and 6c–c of FIGS. 5a, 5b, and 5c, respectively.
Figure 6B:
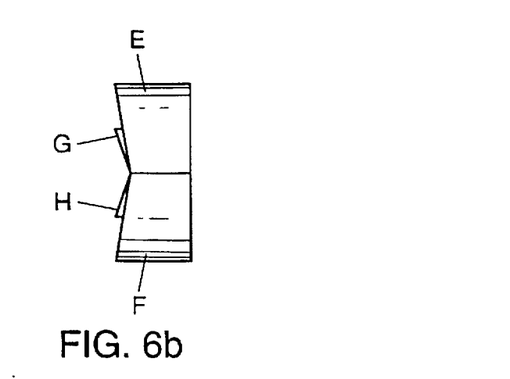
Figure 6C:
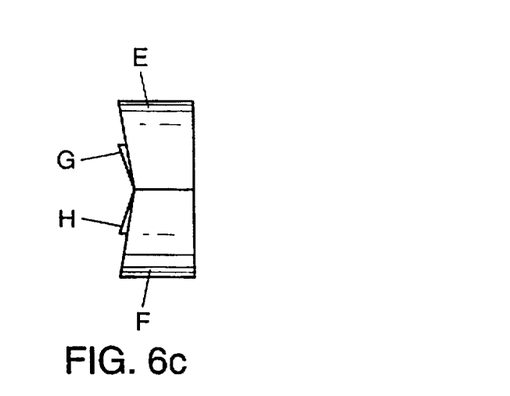
Figure 7A:
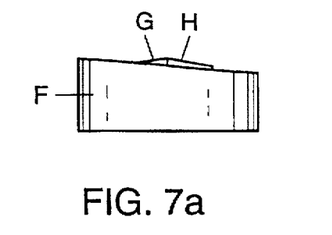
FIGS. 7a, 7b, and 7c are side views respectively taken along the lines 7a–a, 7b–b, and 7c–c of FIGS. 5a, 5b, and 5c, respectively.
Figure 7B:
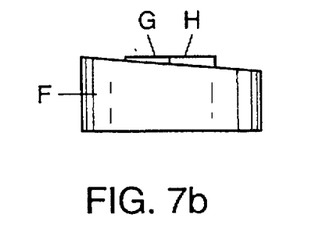
Figure 7C:
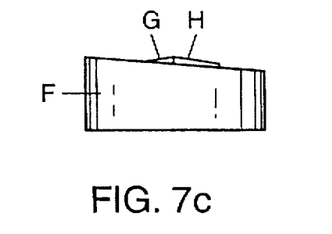

The multi-element prism 66 has a first separator element G, a second separator element H, a third separator element E, and a fourth separator element F. Each of the separator elements has a linearly-sloped beam-directing surface. The multi-element prism 66 is adapted to separate a return beam resulting from said application of said radiation beam to said data track 62 into at least a first portion, a second portion, a third portion, and a fourth portion, respectively. Separator elements G and H separate the return beam along at least one plane substantially parallel to a reference plane defined by an optical axis 69 of said radiation beam and a projected normal 62B to the data track 62 (see FIG. 4). Each separator element engages at least three other separator elements with the first and second separator elements G and H engaging each other and, respectively, the third and fourth separator elements E and F engaging each other at spaced apart locations such that the third and fourth elements E and F surround the first and second elements G and H. As shown in FIGS. 5a–c, the separator elements engage each other along the line 73, whereas the separator elements E and F surround separator elements G and H and engage each other at spaced apart lines 75 and 77. In FIGS. 5a, 6a, and 7a, the separator elements G and H are shown to be triangular in configuration. In FIGS. 6a and 7a, the linearly sloping surfaces are shown in more detail. In a similar fashion, in FIGS. 5b, 6b, and 7b, the separator elements G and H are rectangular in configuration, and in FIGS. 5c, 6c, and 7c, the separator elements G and H are semicircular in configuration.

The element E is arranged adjacent to and on one side of the elements G and H. The element F is arranged adjacent to elements G and H on a side opposite to the element E. By having elements E and F surround elements G and H, the tracking error signal produced by these elements has significantly reduced track offset with disk tilt in the cross track direction.

It should be noted that data track 62 is only a portion of a longer data track which is typically arranged in a spiral configuration on the surface of an optical storage medium such as a recordable compact disk (CD). The data track 62 is shown as a straight line in FIG. 4 because the radius of curvature for its corresponding spiral is generally much larger than a given portion of the data track around a point currently illuminated by the incident radiation beam. Such a portion may therefore be considered substantially straight. A projection 68 of data track 62 onto multi-element prism 66 may be characterized as substantially parallel to a tangent 62A to the data track 62 at the point currently illuminated by the incident radiation beam. A reference plane is defined by an optical axis 69 of the incident radiation beam and a normal 62B to the data track 62. The data track 62, projection 68, the tangent 62A, and the normal 62B are each substantially perpendicular to the optical axis 69. Elements G and H of multi-element prism 66 are thus arranged on opposite sides of the reference plane defined by optical axis 69 and normal 62B to the data track. Elements E and F surround elements G and H. By use of the term surround it is meant that elements G and H also engage elements E and F so that all the exterior portions of elements G and H will be engaged either by element E or element F.

The detector array 72 includes a first, a second, a third and a fourth detector for detecting the first, second, third, and fourth separated portions of the return beam, respectively. The third and fourth detectors are single element detectors designated in FIG. 4 as detector elements e and f. The first detector is a dual element detector including detector elements g and g'. The second detector is a dual element detector including detector elements h and h'. Each detector element may be, for example, a photodiode, a group of photodiodes, or another type of optical photodetector. It should be noted that this particular arrangement of detectors is exemplary only. The detectors may include additional detector elements or fewer detector elements in alternative embodiments. In addition, each of the detectors need not be part of a single detector array. As will be discussed in greater detail below, the separator elements and corresponding detector elements are arranged such that the optical crosstalk between focus and tracking signals is minimized, and the track offset is reduced.

The return beam generally includes both a reflected component, also referred to as a zeroth order diffracted component, and a number of higher order diffracted components diffracted from the optical storage medium. A given diffraction order generally includes both a positive and a negative diffraction component. Although higher order diffraction components may also be present, the present invention can be readily understood without further consideration of diffraction components greater than first order. When the reflected component overlaps with the first order diffracted components, interference occurs. This interference may be directed to detectors e and f to provide, for example, a push-pull TES. The two first order diffraction components may be, for example, contiguous with an optical axis of the incident radiation beam, and therefore both will overlap with the reflected component. It should be noted, however, that the present invention may be utilized in systems in which the positive and negative diffraction components overlap with each other as well as with the reflected component. Additional detail regarding diffraction components may be found in, for example, the above-cited U.S. Pat. No. 5,406,541, and in pp. 172–179 of A. Marchant, "Optical Recording: A Technical Overview," Addison-Wesley, Reading, Mass., which are incorporated by reference herein.

FIGS. 5a–c show a portion of different embodiments of the multi-element prism 66 of the present invention in greater detail. In the exemplary embodiments shown, the first and second separator elements G and H engage at line 73 which is substantially parallel to the normal 62B to the data track 62 and which lies in the above-defined reference plane. The first and second separator elements G and H separate the return beam into first and second portions, respectively, along at least one plane substantially parallel to the reference plane. The first and second separator elements G and H could also be arranged on opposite sides of a plane parallel to the above-defined reference plane. The third separator element E is arranged adjacent to and on one side of the first and second separator elements G and H and engages element F at two spaced apart lines 75 and 77 as discussed above. Lines 75 and 77 are substantially parallel to the data track 62, tangent 62A thereto, and projection 68 thereof. Lines 75 and 77 lie in a plane substantially perpendicular to the above-defined reference plane. The fourth separator element F is arranged on the opposite side of the first and second separator elements G and H and, of course, engages element E at lines 75 and 77. The third and fourth separator elements separate the return beam into third and fourth portions, respectively, along planes substantially perpendicular to the reference plane.

A tracking error signal (TES) may be generated from the third and fourth portions of the return beam incident on the third and fourth detectors e and f of the detector array 72. The TES is generated in accordance with the relationship e-f, which indicates that the signal generated by detector element f is subtracted from the signal generated by detector element e to provide the TES. The third and fourth portions, as a result of passing through the above-described multi-element prism 66, may each include a different diffraction component, such as either a positive or a negative diffraction component, of a given diffraction order, as well as undiffracted components. The diffracted components are those diffracted from the optical storage medium. It should be understood that, in general, only part of any given diffraction component, rather than the entire component, falls within the objective lens aperture and will therefore be incident on multi-element prism 66. References made herein to a particular diffraction component are thus meant to include any part of that component.

A focus error signal (FES) may be generated from the first and second portions of the return beam incident on the first and second detectors g, g' and h, h' of the detector array 72. An FES is generated in accordance with the relationship (g+h')−(g'+h), which indicates that the sum of the signals generated by detector elements g' and h is subtracted from the sum of the signals generated by detector elements g and h' to provide an FES. The first and second portions, as a result of passing through the above-described multi-element prism 46, may each include both positive and negative diffraction components of a given diffraction order, as well as undiffracted components. The diffracted components are those diffracted from the optical storage medium. Each of the detector elements g, g', h and h' thus receives both diffraction components of a given diffraction order. By subtracting the signals resulting from detection of the first and second portions of the return beam in detector elements g, g' and h, h', respectively, the diffraction components of a given diffraction order substantially cancel out, thereby reducing optical crosstalk.

A data signal, indicative of the data stored on data track 62, may also be generated in the optical system 60. For example, a data signal could be generated by combining the signals generated by each detector element in the detector array 72, in accordance with the relationship e+f+g+g'+h+h'. Alternatively, signals from a subset of detector elements could be combined to generate a data signal.

System 60 may also include electronic circuitry (not shown) for combining signals generated by the detector elements of array 72. The electronic circuitry may include adders, subtracters or other types of signal combiners for generating focus error, tracking error, and data signals in accordance with the above-described relationships. Such electronic circuitry is generally well-known in the art and will therefore not be further described herein.

As noted above, the arrangement of separator elements shown in FIGS. 5a–c is exemplary only, and alternative embodiments of the present invention may utilize other arrangements. The terms "substantially parallel" and "substantially perpendicular", as used herein, include deviations of at least ten percent from parallel and perpendicular, respectively. Although the amount of optical crosstalk may increase as a result of such deviations, an improvement over many current prior art systems would generally still be obtained. A beam separator with additional elements could be suitably arranged to separate the return beam into portions which, when detected, generate signals which may be combined in accordance with the present invention such that optical crosstalk is minimized. One skilled in the art could readily modify the multi-element prism 66, detector array 72, and the above-described relationships for generating an FES, a TES and a data signal, to accommodate alternative embodiments.

FIGS. 6a and 7a show a side view of the multi-element prism 66 taken along the lines 6a—6a and 7a—7a of FIG. 5a in which the second separator element H includes an outer surface linearly sloping in one direction. The outer surface of a given separator element refers to a surface on which the return beam is incident before it is separated by the prism. An inner surface refers to a surface exited by a separated portion of the return beam. The first separator element G includes an outer linearly sloping surface in a direction opposite that of the outer surface of second separator element H. These linearly sloping surfaces permit the multi-element prism 66 to direct the first and second portions of the return beam toward the detectors g, g' and h, h' on detector array 72. Similarly, similar constructions are shown in FIGS. 6a–7c, which show different embodiments of the multi-element prism 66.

Those skilled in the art will appreciate that the direction, amount and type of slope may be varied, or an inner surface rather than an outer surface of a given separator element could be shaped so as to suitably direct the return beam. One skilled in the art could readily determine appropriate dimensions, refractive indices, and other parameters for any number of different separator elements, or more generally beam separator elements, suitable for use in the present invention.

Figure 8:
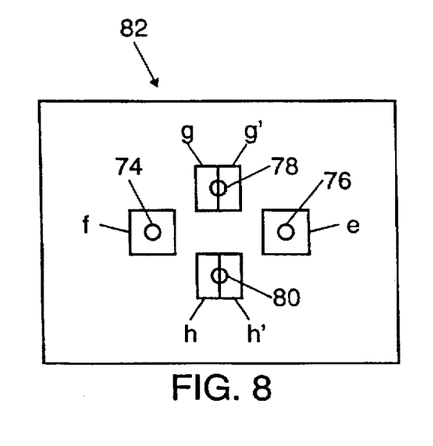
FIG. 8 is an embodiment of a detector array suitable for use in the optical system of FIG. 4.

FIG. 8 shows an alternative detector array 82 suitable for use with the present invention. Each of the portions of the return beam separated by the separator elements of the multi-element prism 66 are focused onto a different detector of the detector array 82 using focusing lens 70 or another suitable focusing device. Exemplary focus spots 74, 76, 78 and 80 indicate an area of each detector on which the third, fourth, first, and second return beam portions, respectively, may be focused when the incident radiation beam is on-track and in-focus relative to the optical storage medium. The detector array 82 includes first, second, third and fourth detectors for detecting the first, second, third and fourth portions of the return beam, respectively. The third and fourth detectors include single detector elements e and f, respectively. The first and second detectors are dual element detectors including detector element pairs g, g', and h, h', respectively. In this embodiment, as in the detector array 72 of FIG. 4, the division between the detector element pairs g, g' and h, h' is along a line substantially parallel to the reference plane defined by optical axis 69 and normal 62B to data track 62. The third and fourth detector elements e and f are arranged on opposite sides of the detector array 82, rather than on the same side as in detector array 72 of FIG. 4. The sloping surfaces of separator elements E and F could be readily modified in a well-known manner to direct the first and second portions of the return beam to detectors e and f, respectively, of array 82.

In general, the location of the detector elements e and f is not critical to the operation of the present invention, and the arrangements in FIGS. 4 and 8 or other alternative arrangements may be chosen in order to satisfy detector array packaging constraints or other criteria. The position of the first and third detectors g, g' and h, h' may also be varied but the division between the pairs should generally be oriented in a direction substantially parallel to the reference plane.

Although the foregoing detailed description has described the present invention primarily in terms of an illustrative optical information storage and retrieval system, it should be understood that the embodiments described are exemplary only. Many variations may be made in the arrangements shown, including, for example, the type of optical device used to separate the return beam and the arrangement, shape and number of separating elements, the number of portions into which the return beam is separated, the arrangement of detectors and detector elements onto which the portions of the return beam are focused, and the type and arrangement of optical components for directing the incident and return radiation beams in the optical system. These and other alternatives and variations will be readily apparent to those skilled in the art, and the present invention is therefore limited only by the appended claims.

Parts List

A, B, C, D,
E, F, G, H separator elements
a, b, c, c', d, d',
e, f, g, g', h, h' detectors 10 optical system
11 optical source
12 collimating lens
13 polarization beam splitter
13A surface
14 quarter-wave plate
15 objective lens
16 optical storage medium
16A optical storage medium surface
16B data track
17 focusing lens
18 detector array
20 focus and tracking sensor system
21 optical storage medium
22 data track
22A tangent to data track
24 objective lens
26 quadrant prism
28 projection
29 optical axis
30 focusing lens
32 detector array
40 focus and tracking sensor system
41 optical storage medium
42 data track
42A tangent to data track
44 objective lens
46 multi-element prism
48 projection
49 optical axis
50 focusing lens p0 52 detector array
60 focus and tracking sensor system
61 optical storage medium
62 data track
62A tangent to data track
62B normal to data track
64 objective lens
66 multi-element prism
68 projection
69 optical axis
70 focusing lens
72 detector array
73, 75, 77 lines
74, 76, 78, 80 focus spots
82 detector array

We claim:

1. An apparatus for providing tracking and focus error signals for controlling an application of a radiation beam to a data track of an optical storage medium, said apparatus comprising:

a multi-element prism having at least a first separator element, a second separator element, a third separator element, and a fourth separator element with at least three of the separator elements having a linearly-sloped beam-directing surface, the multi-element prism adapted to separate a return beam resulting from said application of said radiation beam to said data track into at least a first portion, a second portion, a third portion, and a fourth portion, respectively, wherein the first and second separator elements are arranged in such a amnner that the first and second separator elements are separated by a reference plane defined by an optical axis of the radiation beam and a projected normal to the data track, and each separator element engaging at least three other separator elements with the first and second separator elements engaging each other and, respectively, the third and fourth separator elements engaging each other at spaced apart locations such that the third and fourth elements surround the first and second elements and means for detecting said first, second, third, and fourth portions to produce the tracking and focus error signals.

2. The apparatus of claim 1 wherein the multi-element prism is arranged such that said third and fourth separator elements are separated by a plane perpendicular to said reference plane.

3. The apparatus of claim 1 wherein the detecting means includes:
   a) a first detector to detect said first portion of said return beam;
   b) a second detector to detect said second portion of said return beam;
   c) a third detector to detect said third portion of said return beam; and
   d) a fourth detector to detect said fourth portion of said return beam.

4. The apparatus of claim 1 further including:

a detector array including said first detector, said second detector, said third detector, and said fourth detector; and a focusing lens arranged between said multi-element prism and said detector array to converge said portions of said return beam on said detectors.

5. The apparatus of claim 3 wherein said first and said second detectors are used to produce said focus error signal from said first and second portions of said return beam and said third and fourth detectors are used to produce said tracking error signal.

6. The apparatus of claim 5 wherein said first and said second detectors each include two detector elements divided along a line parallel to said projected normal.

7. The apparatus of claim 1 wherein said first and second separator elements are triangular in configuration.

8. The apparatus of claim 1 wherein said first and second separator elements are rectangular in configuration.

9. The apparatus of claim 1 wherein said first and second separator elements are semicircular in configuration.

* * * * *